United States Patent [19]

Mitchell

[11] Patent Number: 4,958,770
[45] Date of Patent: Sep. 25, 1990

[54] PROCESS FOR MAKING UNIFORM POROSITY FLEXIBLE IRRIGATION PIPE

[75] Inventor: William S. Mitchell, McKenzie, Tenn.

[73] Assignee: Prescision Porous Pipe, Inc., McKenzie, Tenn.

[21] Appl. No.: 346,637

[22] Filed: May 3, 1989

[51] Int. Cl.⁵ .............................................. A01G 27/00
[52] U.S. Cl. ...................................... 239/145; 264/41;
    264/45.9; 264/178 R; 264/209.3; 264/209.7;
    264/211.21; 425/4 C; 425/379.1; 425/380;
    425/817 C
[58] Field of Search .......... 264/178 R, 45.9, DIG. 69,
    264/209.1-209.8, 211.21, 41; 425/4 C, 817 C,
    379.1, 380; 239/542, 145

[56] References Cited

U.S. PATENT DOCUMENTS

| | | | |
|---|---|---|---|
| 2,612,655 | 10/1952 | Mathues | 264/211.21 |
| 2,666,947 | 1/1954 | Shaw | 264/209.8 |
| 3,060,512 | 10/1962 | Martin et al. | 425/379.1 |
| 3,717,695 | 2/1973 | Barnes et al. | 264/209.4 |
| 4,110,420 | 8/1978 | Turner | 264/209.7 |
| 4,117,073 | 9/1978 | Koch et al. | 264/211.21 |
| 4,143,105 | 3/1979 | Hentschel et al. | 264/54 |
| 4,209,476 | 6/1980 | Harris | 264/209.1 |
| 4,577,998 | 3/1986 | Dorrn | 264/54 |
| 4,616,055 | 10/1986 | Mason | 264/45.9 |

*Primary Examiner*—Jeffery Thurlow
*Attorney, Agent, or Firm*—E. J. Holler

[57] ABSTRACT

This invention relates to the manufacture of flexible porous irrigation pipe having an essentially uniform porosity throughout its length which is produced by extruding an essentially moisture-free non-homogeneous, mixture of pre-vulcanized elastomeric particles such as reclaimed crumb rubber from vehicle tire treads in major amount and a thermoplastic polymer binder such as low-density polyethylene in minor amount. The mixture is intimately mixed and extruded from an unvented extruder through an annular extruder die at a precisely-controlled temperature and then through a lengthy cooling liquid bath, the rate of pull-off through the extruder die and liquid bath being maintained constant. The leak rate of the fluid delivered from the porous pipe is substantially uniform over a lengthy prescribed dimension exhibiting a delivery variation of less than about 5 percent per unit of length.

14 Claims, 1 Drawing Sheet

PROCESS FOR MAKING UNIFORM POROSITY FLEXIBLE IRRIGATION PIPE

FIELD OF THE INVENTION

This invention relates to the production of flexible porous irrigation pipe and, more particularly, to an irrigation pipe in which the porosity is substantially uniform throughout the length of the pipe.

BACKGROUND OF THE INVENTION

In recent years considerable effort has been expended on delivering and conserving water as it has become an increasingly valuable and expensive resource. It has become necessary to develop more efficient systems for delivering water to sustain plant life. Most above-ground irrigation systems have utilized sprinkler devices for surface watering which is extremely wasteful in that the water flows off the surface and is not uniformly absorbed, or rapidly evaporates, only limited portions reaching the plant roots. The roots are the water-utilization system for most plants and must be present for their enzyme-water dependent processes to sustain plant life. In addition, above-ground watering practices interfere with use of recreational areas such as playing fields and golf courses, for example. Most importantly, surface water cannot be specifically directed to the desired plants or crops being applicable to both desired and undesired plant life, such as weeds.

Subsurface irrigation systems have been developed in which water, both with and without nourishing fertilizer, is directly delivered to the subsurface depth of the crop roots being cultivated. Such systems have employed flexible pipe which is inert to the soil conditions, and is capable of withstanding hydrostatic pressure without collapsing. The pipe may be readily bent to follow crop-line contours and elevations. The pipe which emits water slowly over its entire surface and length is buried to the proper depth underground for the particular crop or plant life being irrigated so that water is supplied directly to the plant roots. The amount of water delivered can be precisely controlled at or near optimum levels for the particular crop or plant life. In many cases crop yields have been substantially increased. Irrigation using porous pipe requires that the water be delivered uniformly along its length. The soil soaking process is generally similar to that obtained by drip irrigation; however, the leak rate is continuous along the pipe length rather than at discrete individual points or outlets as in drip irrigation.

Porous irrigation pipe produced from reclaimed rubber mixed with polyethylene as a binder has been disclosed by Turner in U.S. Pat. Nos. 4,003,408, 4,110,420 and 4,168,799. The prescribed mixture is extruded to form the pipe, and the water present within the hot extrudate vaporizes, producing the small pores through which water is emitted under low pressure. Such pipe presents problems in use due to its highly variable and uncontrolled porosity. Some sections have exhibited few or no pores while other sections have very large uneven pores. Water delivery rates from this pipe have varied from 50 to 75 percent along relatively short lengths indicating the product is unsuitable for close plantings. Thus, the overall porosity of the pipe is not sufficiently controlled for uniform water delivery resulting in problems when designing a subsurface water irrigation system for a prescribed location. It appears that the wide variation in porosity of this pipe product is primarily due to failure to control the moisture content of the extruded mixture. In the manufacture of this product attempts were made to control excess water in the mixture by venting the extruder, but this procedure did not result in controlling the variable porosity of the pipe. In addition, the vented extruder produces a pipe product having a rough internal surface which results in a high pressure drop along a length of pipe due to a high coefficient of friction and high Reynolds numbers for fluid flow. Such condition increases uneven water emission along a given length of porous pipe.

Other attempts to improve porous irrigation pipe have been made by Mason in U.S. Pat. Nos. 4,517,316, 4,615,642, and 4,616,055. In his processes the raw materials are preprocessed into shaped pellet form to provide a pre-formed feed material to the extruder which is less hygroscopic than powdered feed materials. However, his process is more costly and involved requiring the pelletizing steps. In addition, his moisture content of the pellets is much higher than that of the present invention ranging from 0.5 to 3.0 precent by weight of water. Such water content does not improve the uniformity of porosity of the pipe but exacerbates the problems of non-uniform porosity and uneven water emission. Mason in U.S. Pat. No. 4,517,316 utilizes additional constituents such as slip agents and lubricants, and excessive amounts of water in his pelletized mixture, and extrudes the pellets from the pipe extruder at an excessively high temperature. His porous pipe shows no improvement in porosity variation over that of the prior art, primarily due to excessive moisture in his pellets. Mason in U.S. Pat. No. 4,615,642 attempts to improve leak rate variation by varying the extruder die temperature and by varying the pull-off rate of the pipe. He seeks to controllably increase the porosity from first inlet end to second outlet end of the pipe length so that the leak rate is constant throughout the pipe length as the pressure drops between the ends. However, such constant varying of process variables does not produce an improved porous pipe. Mason in U.S. Pat. No. 4,616,055 also pelletizes the raw materials and employs additives to increase the flow of binder resin around the rubber particles; however, it does not result in more uniform porosity of the pipe. He coats the surface particles on the inner wall of the pipe to no avail in attempting to solve the porosity problems. In addition, all of Mason's porous pipe possesses length limitations in actual use despite his variable process procedures. His control of the water content of the raw materials in pellet form is inadequate for the intended purpose.

SUMMARY OF THE INVENTION

This invention relates to porous irrigation pipe produced in accordance with the subject process having a porosity which is precisely uniform. The process utilizes raw materials which have an extremely low moisture content and are extruded from an unvented single-screw extruder. The extruder temperature especially at the extruder die and the pull-off rate are precisely controlled to produce a porous pipe having a uniform leak rate throughout lengthy runs of the pipe over a broad range of water pressures. The pipe issuing from the extruder is slowly cooled in a lengthy liquid bath, the uniform porosity being obtained by the non-homogenity of the raw material mixture and its being essentially moisture-free. Since it is known that rather small changes in the pull-off rate produce large changes in the leak rate of the pipe, the extrusion of the pipe and its pull-off through the liquid bath are maintained constant for optimum results. The temperature control of the extrusion die and the constant speed of the extrusion and puller are controlled by electronic controllers to provide the precise and stable conditions required.

The use of a non-vented extruder is preferred since the water content of the extrudate is maintained extremely low and no need exists to vent excess vapor pressure. With the moisture content of the extrudable mixture being controlled to less than about 0.15 percent by weight water, porosity in the pipe can be controlled and is not dependent on water vapor producing small apertures or pores in the pipe walls. In view of the other elements of the process being precisely controlled, vapor pressure does not influence the pore creation, but the non-homogenity of the intimate mixture based on two major constituents is a most significant factor. Porosity of a given run of pipe as manufactured in accordance with this invention has shown a variation in fluid delivery of less than about 5 percent. Thus, the porous pipe can be efficiently made having highly uniform porosity through the desired range of size and strength limitations for its use in a wide range of irrigation applications. The pipe is not limited to prescribed lengths of runs as has been common in the prior art. Porous pipe has been produced having a much more uniform and regular pore structure primarily due to improved control of the materials in the dual-component system without the addition of slip agents or lubricants.

DETAILED DESCRIPTION OF THE INVENTION

Figure 1:
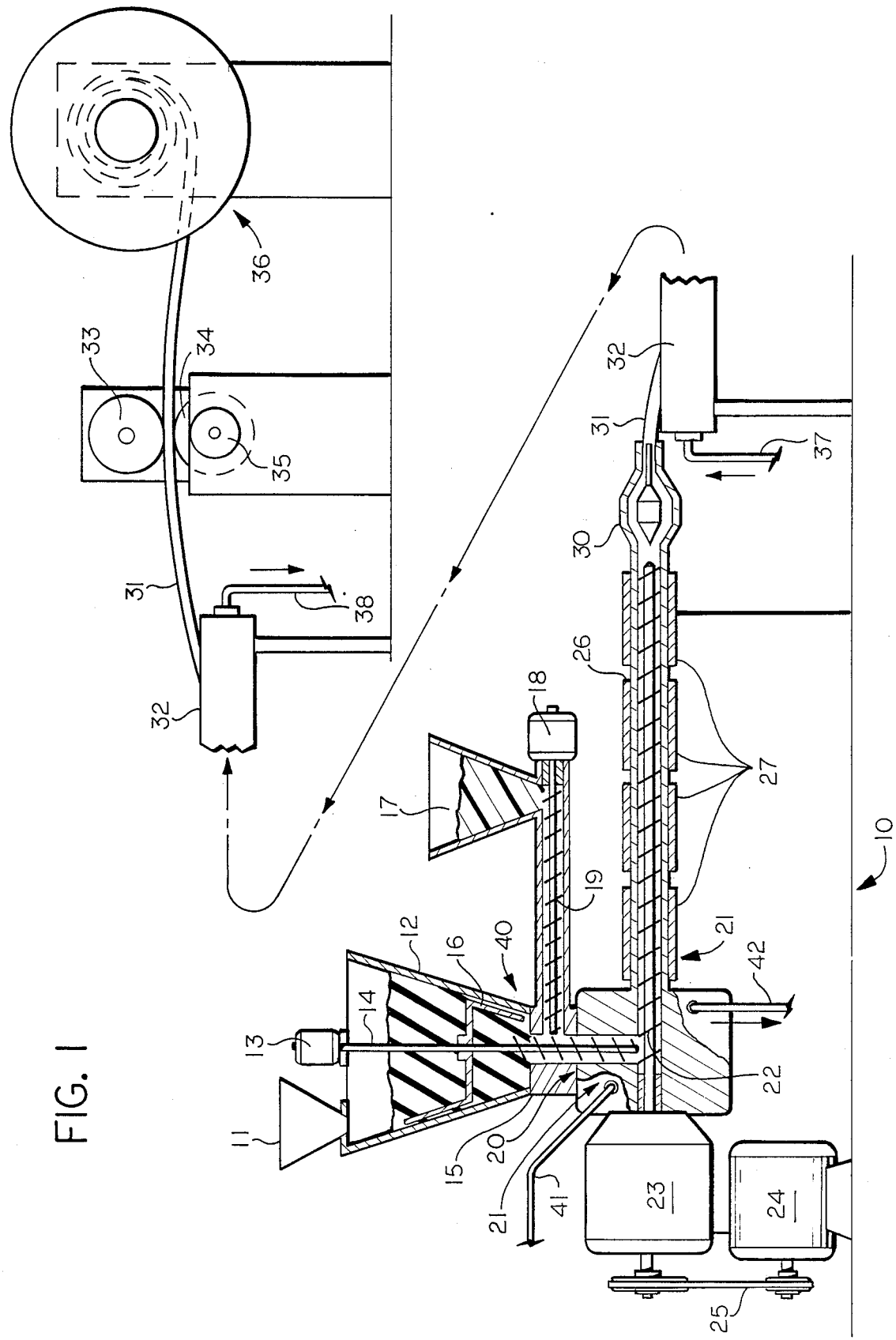
FIG. 1 is a schematic view of a system for extruding and cooling porous pipe in accordance with the invention.

The extrudable mixture of the present invention comprises a major portion of pre-vulcanized elastomer in crumb form and a minor portion of a low-density polyolefin as a binder such as polyethylene. No further constituents are required; however, in some cases it may be desirable to include extremely small amounts of slip agents or lubricants depending upon process parameters.

The elastomer is preferably a previously vulcanized natural or synthetic rubber, a pre-vulcanized crumb rubber reclaimed from the tread portion of vehicular tires being a most readily available and inexpensive constituent. The tread portion is known to comprise the better quality rubber of such tires, much more so than the sidewalls or casings. The rubber is ground into crumb-like particles preferably having a size of about 40 mesh (0.0165 inch) and desirably not more than about 30 mesh. The preferred crumb rubber is one which is relatively uniform and passes through a 40 mesh screen.

The binder component is a thermoplastic material such as low-density polyethylene resin capable of thermal softening at a temperature below about 300° F. Such resin is inert to the other component of the pipe i.e. the crumb rubber, and forms a non-homogeneous mixture therewith under the prevailing conditions of thermal extrusion. Other binders may be substituted for the polyethylene; however this material is preferred since it is unreactive in soil environment in long term use and to various chemicals and fertilizers which may be dispensed through the pipe along with water. Low density polyethylenes are known to have a density ranging from about 0.90 to 0.93 gram/cubic centimeter, and porous pipe made with such binder resin is very flexible and can be easily bent to desired configurations and contours. The polyethylene is usually employed in the form of granules or particles also having a fineness of about 40 mesh.

Both the crumb rubber and polyethylene resin binder are thoroughly dried prior to their introduction into the extruder. The total moisture content of each component and the mixture is maintained at a level of below about 0.15 percent by weight water prior to their combined use. Such low water content is critical to the development of small uniform pores in the pipe during and after extrusion. The non-homogenity of the mixture serves to create the pores of a regular spaced-apart nature in the pipe wall.

The mixture consists of about 64 to 68 percent by weight crumb rubber and about 32 to 36 percent by weight polyethylene, the preferred ratio being about 66–34 percent by weight respectively.

The mixture is either combined and intimately mixed prior to its introduction into the extruder or delivered to the extruder by separate component hoppers affixed thereto as shown in FIG. 1. The mixture is further mixed and heated within the extruder and passed therethrough by a single-screw having a continuous spiral flight. The mixture is fully melted together, the binder being thermally softened and the rubber particles remaining as discrete individual unmelted irregularly-shaped crumbs. The crumbs are fully coated by the binder during the mixing action, the lack of moisture assisting such coating.

Referring to FIG. 1 of the drawings, the extrusion apparatus 10 consists of a conventional single-flight extruder which is unvented due to the inherentlydry condition of the extrudable materials. A preferred example is a 3½ inch, 24 to 1 ratio of length to diameter extruder, which is both non-vented and air-cooled. A drier chamber 11 is provided to fully dry the crumb rubber. A crammer hopper 12 is mounted on an upper region of the extruder, an electric motor 13 being employed to drive the feeding element in the crammer hopper 12. A crammer drive arm 14 is used to operate crammer screw 15 to deliver the dried crumb rubber into the extruder. Crammer wiper arms 16 serve to wipe the hopper inner walls for smooth delivery of the crumb rubber.

A second feeder hopper 17 is provided to contain the binder material, i.e. polyethylene resin, which is mounted on an upper region of the extruder. A second electric motor 18 is used to drive a feeder screw 19 to deliver the binder into the extruder. The several dried materials are introduced into a feed throat 20 which is water-cooled and then into the extruder 21. The extruder has a gear-driven mixing screw 22 which is driven by a gear box 23 having a reduction ratio of about 17.5 to 1.

The gear box is driven by a relatively large electric motor 24 through a connecting drive belt 25. The extruder barrel 26 extends horizontally and is provided with a carbide-hardened liner as known in the art. The barrel is provided with about 4 or 5 electrically-heated, air-cooled elements 27 spaced along the barrel which control the zonal heating of the extrudate in the barrel. An annular pipe die 30 having about two annular heating elements mounted around the die is used to precisely control the die temperature and the newly-formed porous pipe 31 emitting therefrom.

The pipe is delivered into a lengthy cooling trough 32 located closely adjacent the pipe die. The pipe is supported on spaced-apart rollers mounted within the trough. The trough is quite lengthy extending preferably about 70 to 80 feet in a straight line and containing cooling water having a temperature of about 48° to 52° F. The pipe sets up into final form within the trough. Puller drive wheels 33 and 34 are mounted in vertical array to contact upper and lower surfaces of the pipe to pull the same through the trough. The lower drive wheel 34 of the puller is driven by a puller motor 35 to exert tension in the pipe for its uniform delivery to a winder 36 for wrapping the pipe onto a spool.

The electric motors 24 and 35 which drive the extruder and puller respectively are preferably D.C. motors and are slaved together to obtain very precise control over the pipe extrusion and pull off rate at the same speed. Thus, the process is capable of producing a very uniform product having the desired porosity.

Inlet line 37 delivers chilled cooling water into the trough 32 and the warmed water exits from the trough through outlet line 38. A temperature controller connected to a flow meter (not shown) is used to maintain a uniform water temperature in the cooling trough. Also the so-called additive head 40 of the extruder is maintained at a constant temperature by cooling water introduced therein through inlet line 41 and outlet line 42. Thus, the extrudate is introduced into the extruder at a precisely-controlled temperature.

The annular extruder die is maintained at a temperature ranging from about 270° to 290° F. The pipe is formed in a variety of sizes, a preferred range of sizes ranging from about 0.375 to 1.0 inch internal diameter with a wall thickness of about 0.11 inch. The porous pipe exhibits an extremely uniform porosity of less than about 5 percent fluid delivery variation whether a liquid or gas is emitted from the pipe. The uniformity of the pores permit very lengthy runs of pipe to be employed in a wide variety of application uses.

Various modifications may be resorted to within the spirit and scope of the appended claims.

I claim:

1. The process for forming lengthy flexible porous irrigation pipe having a porosity which is essentially uniform throughout its length comprising the steps of extruding from an unvented extruder through an annular extruder die an intimate mixture of (a) pre-vulcanized elastomeric particles consisting of ground crumb rubber from vehicle tire treads in major amount and (b) low-density polyethylene particles in granular form as a binder in minor amount, both said elastomeric particles and polyethylene particles being essentially moisture-free, forming a continuous length of extruded pipe from said moisture-free intimate mixture, passing the newly-formed extruded pipe through a lengthy water bath to slowly cool the pipe into final form, and controlling the rate of delivery of said newly-formed pipe from said extruder die and through said water bath at essentially the same rate, said pipe exhibiting a porosity of less than about 5 percent variation in fluid delivery throughout its length.

2. The process in accordance with claim 1 including the step of extruding the said mixture from said annular extruder die at a temperature ranging from about 270° to 290° F.

3. The process in accordance with claim 1 wherein the said mixture of elastomeric particles and low-density polyethylene particles have a moisture content of less than about 0.15 percent by weight water.

4. The process in accordance with claim 1 wherein the said mixture comprises from about 64 to 68 percent by weight elastomeric particles and from about 32 to 36 percent by weight low-density polyethylene particles, both being intimately mixed and heated within said extruder prior to extrusion.

5. The process in accordance with claim 1 wherein the said pre-vulcanized elastomeric particles are ground to a fineness of about 40 mesh and are dried prior to their introduction into said extruder.

6. The process in accordance with claim 1 wherein the said low-density polyethylene particles in granular form have a fineness of about 40 mexh and are dried prior to their introduction into said extruder.

7. The process in accordance with claim 1 wherein the said newly-formed pipe is pulled in tension from said extruder die and through said water bath at substantially a constant rate by a tension puller to control pipe porosity.

8. The process in accordance with claim 1 wherein the said porous pipe is formed having an internal diameter ranging from about 0.375 to 1.0 inch with a wall thickness of about 0.11 inch.

9. The process in accordance with claim 1 wherein the said water bath has a length of not less than about 70 feet and a constant flow of cooling water therethrough.

10. The process in accordance with claim 1 wherein the temperature of the extruder die is maintained substantially constant as the length of pipe is extruded.

11. The process in accordance with claim 1 wherein the speed of pull-off of pipe from the extruder die and through said water bath is maintained precisely constant to obtain uniform porosity.

12. As an article of manufacture, the lengthy flexible porous irrigation pipe having a porosity of less than about 5 percent fluid delivery variation throughout its length made in accordance with the process of claim 1, said pipe being formed from an essentially moisture-free mixture of elastomeric particles and polyethylene particles.

13. As a product-by-process made in accordance with the process of claim 1, a lengthy flexible porous irrigation pipe having an internal diameter ranging from about 0.753 to 1.0 inch and a porosity of less than about 5 percent fluid delivery variation throughout its length said pipe being formed from an essentially moisture-free mixture of elastomeric particles and polyethylene particles.

14. As a product-by-process made in accordance with the process of claim 1, a lengthy flexible porous irrigation pipe comprised of a moisture-free nonhomogeneous mixture of from about 64 to 68 percent by weight elastomeric particles and from about 32 to 36 percent by weight low-density polyethylene particles and having essentially uniform porosity, said pipe having a porosity of less than about 5 percent variation in fluid delivery throughout its length.

* * * * *